(12) United States Patent
Johansson et al.

(10) Patent No.: US 10,263,411 B2
(45) Date of Patent: Apr. 16, 2019

(54) ELECTRONIC FUSE SYSTEM AND A METHOD THEREFORE

(71) Applicant: TELEFONAKTIEBOLAGET LM ERICSSON (PUBL), Stockholm (SE)

(72) Inventors: Patrik Johansson, Myggenäs (SE); Patrik Forsberg, Kungälv (SE); Henrik Isaksson, Torslanda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/113,248

(22) PCT Filed: Feb. 10, 2014

(86) PCT No.: PCT/SE2014/050162
§ 371 (c)(1),
(2) Date: Jul. 21, 2016

(87) PCT Pub. No.: WO2015/119545
PCT Pub. Date: Aug. 13, 2015

(65) Prior Publication Data
US 2017/0025841 A1    Jan. 26, 2017

(51) Int. Cl.
*G05D 17/00*    (2006.01)
*H02H 1/00*    (2006.01)
(Continued)

(52) U.S. Cl.
CPC ............ *H02H 1/0092* (2013.01); *G05B 9/02* (2013.01); *H02H 3/006* (2013.01); *H02H 3/08* (2013.01);
(Continued)

(58) Field of Classification Search
None
See application file for complete search history.

(56) References Cited

U.S. PATENT DOCUMENTS 5,666,256 A     9/1997  Zavis et al.
5,982,596 A *  11/1999  Spencer .................. H02H 3/04
                                                               361/102
(Continued)

OTHER PUBLICATIONS

International Search Report and Written Opinion dated Oct. 21, 2014 in related International Application No. PCT/SE2014/050162.
(Continued)

*Primary Examiner* — Wissam Rashid
(74) *Attorney, Agent, or Firm* — Patent Portfolio Builders PLLC (57) ABSTRACT

The disclosure relates to an electronic fuse system, and to a method for an electronic fuse system. The method comprises determining (201) if the number of engaged electronic circuit breaker modules (108) has changed compared to the stored configuration. Upon determining that the number of engaged electronic circuit breaker modules (108) has changed, determining (202) if the configuration of the electronic fuse system has changed by means of comparing a stored configuration in the power distribution controller (105) and a stored configuration in the electronic circuit breaker module (108). Upon determining that the configuration of the electronic fuse system has changed, determining (203) if a stored configuration is available from the bus (101). Upon determining (203) that a stored configuration is available from the bus, fetch (204) the stored configuration from the bus and start operation of the electronic fuse system according to the fetched configuration. Upon determining (203) that a stored configuration is not available from the bus, determining (205) if a stored configuration is available from the connectable external main processor. Upon determining (205) that a stored configuration is available from the connectable external main processor, fetch (206) the configuration from the connectable external main processor and start operation of the electronic fuse system according to the (Continued)

fetched configuration. Upon determining (205) that a stored configuration is not available from the connectable external main processor, start operation of the electronic fuse system according to a default configuration (207).

10 Claims, 4 Drawing Sheets (51) Int. Cl.
*H02H 3/00* (2006.01)
*H02H 3/08* (2006.01)
*H02H 7/26* (2006.01)
*G05B 9/02* (2006.01)
*H02H 1/06* (2006.01)
*H02J 13/00* (2006.01)

(52) U.S. Cl.
CPC ............. *H02H 7/261* (2013.01); *H02H 1/063* (2013.01); *H02J 13/002* (2013.01); *Y02E 60/725* (2013.01); *Y02E 60/7815* (2013.01); *Y04S 10/20* (2013.01); *Y04S 40/121* (2013.01)

(56) References Cited

U.S. PATENT DOCUMENTS

| 8,050,005 | B2 | 11/2011 | Lindqvist et al. | |
|---|---|---|---|---|
| 8,649,143 | B2* | 2/2014 | Gass | H02H 3/20 |
| | | | | 361/91.1 |
| 2005/0212526 | A1* | 9/2005 | Blades | G01R 31/02 |
| | | | | 324/543 |

OTHER PUBLICATIONS

Rambold, "Power Distribution to provide reliable function of DC/DC-Converters," 19th International Telecommunications Energy Conference, 1997. INTELEC 97, Oct. 19-23, 1997, pp. 443-447, Melbourne, AU.

* cited by examiner

ELECTRONIC FUSE SYSTEM AND A METHOD THEREFORE

TECHNICAL FIELD

The embodiments described herein relate generally to electronic fuses and in particular to electronic fuse systems.

BACKGROUND

Electronic fuses, such as for example the electronic fuse disclosed in U.S. Pat. No. 8,050,005, may comprise a current shunt and a controlled switch. The voltage drop over the current shunt is sensed by a comparator and is proportional to the current flowing through the current shunt. The trip value of the electronic fuse is selected by selecting a specific voltage of the comparator. In a preferred embodiment the controlled switch is a MOS transistor with low on-resistance. The use of electronic fuses is steadily increasing due to the possibility to tailor and control the electronic fuses. It is today common to include electronic fuses directly on a circuit board close to the power consumer.

Yet another solution is disclosed and outlined in a conference paper by Klaus Rambold, "Power distribution to provide reliable function of DC/DC converters" (ISBN 0-7803-3996-7). This solution discloses the use of electronic fuses as additional means to improve system behaviour, such as for example during hot swapping of circuit boards that causes large inrush current during start-up.

In order to provide a fuse box that utilizes electronic fuses, a number of solutions are available in the art. The disclosed systems are unflexible and unexpandable with a fixed number of fused outputs, which causes a lot of unused outputs as well as unnecessary energy consumption. Not to mention the associated costs of using unnecessary complex circuits.

There is therefore a need for an improved system of electronic fuses that overcome the above mentioned problems associated with existing solutions.

SUMMARY

An object of the invention is to provide improved methods and systems for electronic fuses.

The above stated object is achieved by means of a method and a system according to the independent claims.

According to a first aspect, a method is provided for an electronic fuse system, the electronic fuse system comprising a bus connectable to an external power supply, and a communication line. The bus has at least two bus connection means each having a unique address on the bus. The electronic fuse system further comprises a power distribution controller. The power distribution controller comprises a bus connector configured to engage one of said bus connection means, and a first processing means configured to store the configuration of the electronic fuse system and a first identifier of the power distribution controller. The power distribution controller further comprises a communication circuit connected to the first processing means and configured for communication with a connectable external main processor. The communication circuit is further configured to communicate via the bus connector. The power distribution controller further comprises an electronic circuit breaker module. The electronic circuit breaker module comprises a bus connector configured to engage one of said bus connection means, an electronic fuse configured to supply a voltage terminal with a voltage from the bus via the bus connector, and a second processing means configured to control the electronic fuse and to store a configuration of the electronic fuse system and a second identifier of the electronic circuit breaker module. The method comprises determining if the number of engaged electronic circuit breaker modules has changed compared to the stored configuration. Upon determining that the number of engaged electronic circuit breaker modules has changed, the method comprises determining if the configuration of the electronic fuse system has changed by means of comparing a stored configuration in the power distribution controller and a a current configuration obtained by polling the bus connection means. Upon determining that the configuration of the electronic fuse system has changed, the method comprises determining if a stored configuration is available from the bus. Upon determining that a stored configuration is available from the bus, the method comprises fetching the stored configuration from the bus and start operation of the electronic fuse system according to the fetched configuration. Upon determining that a stored configuration is not available from the bus, the method comprises determining if a stored configuration is available from the connectable external main processor. Upon determining that a stored configuration is available from the connectable external main processor, the method comprises fetching the configuration from the connectable external main processor and start operation of the electronic fuse system according to the fetched configuration. Upon determining that a stored configuration is not available from the connectable external main processor, the method comprises starting operation of the electronic fuse system according to a default configuration.

A second embodiment provides an electronic fuse system, comprising a bus connectable to a connectable external power supply, and a communication line, and at least two bus connection means each having a unique address on the bus. The electronic fuse system further comprises a power distribution controller, comprising a bus connector configured to engage one of said bus connection means of the bus, a first processing means configured to store the configuration of the electronic fuse system and an identifier of the power distribution controller. The power distribution controller further comprises a communication circuit connected to the first processing means for communication with a connectable external main processor. The electronic fuse system further comprises an electronic circuit breaker module, comprising a bus connector configured to engage one of said bus connection means of the bus, an electronic fuse configured to supply a voltage terminal with a voltage from the bus via the bus connector, and a second processing means configured to control the electronic fuse and to store a configuration of the electronic fuse system and an identifier of the electronic circuit breaker module. The first processing means of the power distribution controller is further adapted to determine if the number of engaged electronic circuit breaker modules has changed compared to the stored configuration. Upon determining that the number of engaged electronic circuit breaker modules has changed, the first processing means is further adapted to determine if the configuration of the electronic fuse system has changed by means of comparing a stored configuration in the power distribution controller and a current configuration obtained by polling the bus connection means. Upon determining that the configuration of the electronic fuse system has changed, the first processing means is further adapted to determine if a stored configuration is available from the bus. Upon determining that a stored configuration is available from the bus, the first procsessing means is further adapted to fetch the stored configuration from the bus and start operation of the electronic fuse system according to the fetched configuration. Upon determining that a stored configuration is not available from the bus, the first procsessing means is further adapted to determine if a stored configuration is available from the connectable external main processor. Upon determining that a stored configuration is available from the connectable external main processor, the first procsessing means is further adapted to fetch the configuration from the connectable external main processor and start operation of the electronic fuse system according to the fetched configuration. Upon determining that a stored configuration is not available from the connectable external main processor, the first procsessing means is further adapted to start operation of the electronic fuse system according to a default configuration.

An advantage of some disclosed example embodiments is that an improved electronic fuse system is provided.

A further advantage of some disclosed example embodiments is that an expandable and flexible electronic fuse system is provided.

Further advantages and features of embodiments of this disclosure will become apparent when reading the following detailed description in conjunction with the drawings.

DETAILED DESCRIPTION

The following detailed description of the example embodiments refers to the accompanying drawings. The same reference numbers in different drawings identify the same or similar elements. Also, the following detailed description is provided for the purpose of illustration and explanation of some example embodiments and not for the purpose of limitation.

Figure 1:
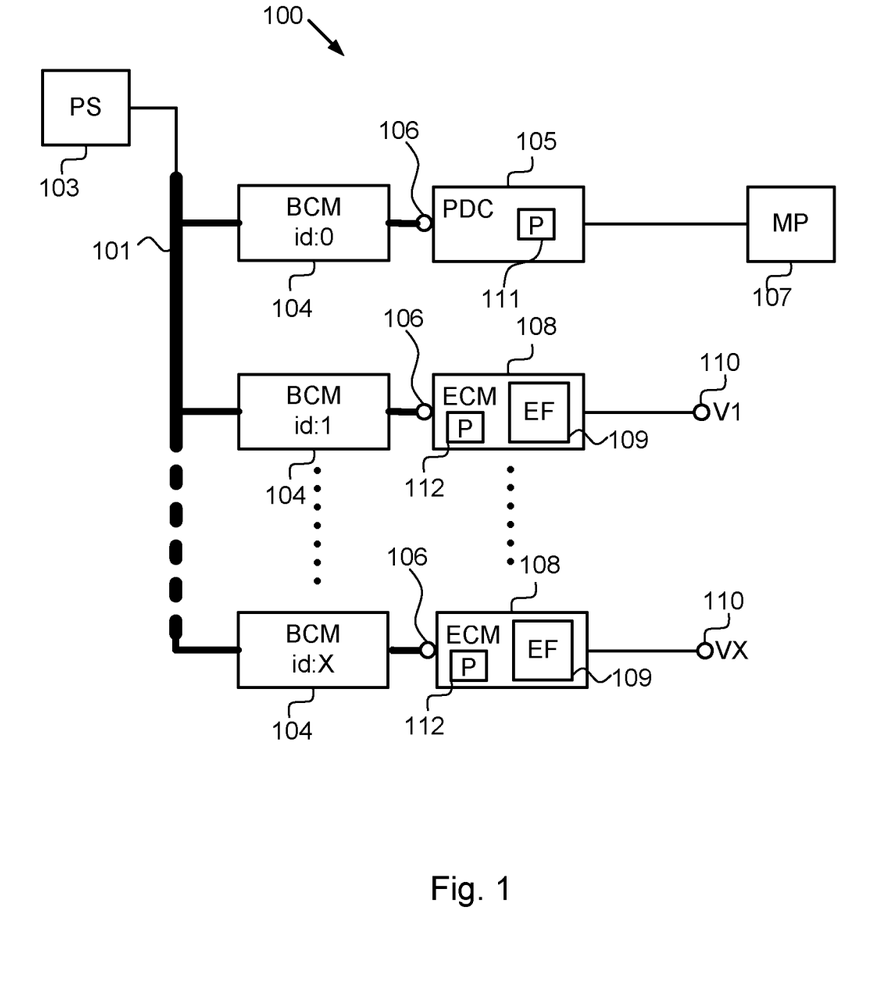
FIG. 1 is a schematic block diagram illustrating an embodiment of an electronic fuse system.

FIG. 1 is a schematic block diagram of an electronic fuse system, generally designated 100. The electronic fuse system 100 comprises a bus 101. The bus 101 is connectable to an external power supply 103. In one embodiment, the external power supply may be configured to supply the bus 101 with −48 V. The bus 101 further comprises at least two bus connection means 104. Each bus connection means 104 has a unique address on the bus 101. The bus connection means 104 is further configured to distribute power from the external power supply 103 as well as being configured to allow communication between the at least two bus connection means 104 via a communication line.

The electronic fuse system 100 further comprises a power distribution controller 105. The power distribution controller 105 comprises a bus connector 106 being configured to engage the bus connection means 104, and upon engagement supply the bus connector 106 with power and communication capabilities through the bus 101 via the bus connection means 104. Since, the bus connection means 104 is provided with a unique address on the bus 101, the physical position of the power distribution controller 105 on the bus 101 is known.

The power distribution controller 105 further comprises a first processing means 111. In one embodiment, the first processing means 111 comprises a processor and a memory, wherein the memory contains instructions to be executed by the processor. The first processing means is further configured to store the configuration of the electronic fuse system 100 and a first identifier of the power distribution controller 105. The configuration of the electronic fuse system 100 comprises information about which power distribution controller 105 is engaged with which bus connection means 104. Thus, the combination of the address of the engaged bus connection means 104 and the first identifier gives an exact information about the position of the power distribution controller 105 on the bus 101.

The first processing means 111 is further configured to communicate with a connectable external main processor 107 by means of a communication circuit. This external main processor 107 may in a preferred embodiment be configured to monitor the electronic fuse system 100 and to control the operation thereof. The connection in one embodiment between the power distribution controller 105 and the external main processor 107 may be a RS 485 link or an Ethernet connection. The external main processor 107 is further configured to store the configuration of the electronic fuse system in a memory of the external main processor 107, and upon a request transfer said configuration to the power distribution controller 105.

The electronic fuse system 100 further comprises an electronic circuit breaker module 108. The electronic circuit breaker module 108 comprises a bus connector 106 provided for engaging a bus connection means 104. The electronic circuit breaker module 108 further comprises an electronic fuse 109 provided for supplying a voltage terminal $V_1$ 110 with power from the bus 101 through said bus connection means 104 and said bus connector 106. The operation of the electronic circuit breaker module 108 is controlled by means of a second processing means 112 that in one embodiment comprises a processor and a memory, wherein the memory contains instructions executable by said processor. The electronic fuse 109 may in one embodiment comprise a switching element connected in serie with a current shunt. The voltage drop over the current shunt is measured by means of a comparator. The output from the comparator controls the switching element, such that if a voltage threshold is exceeded the comparator causes the switching element to turn off. The voltage threshold may in one embodiment be controlled by means of the second processing means 112. Thus, the characteristics of the the electronic fuse 109 may be adjusted by means of the power distribution controller 105 and communication through the bus 101.

In one embodiment of the electronic fuse system 100 a power distribution controller 105 controls a plurality of electronic circuit breaker modules 108. Due to the address of the bus connection means 104 and the first identifier and the second identifier, respectively, the exact physical configuration of the electronic fuse system 100 is known and stored in the memory of the first processing means 111 and the second processing means 112.

Figure 2:
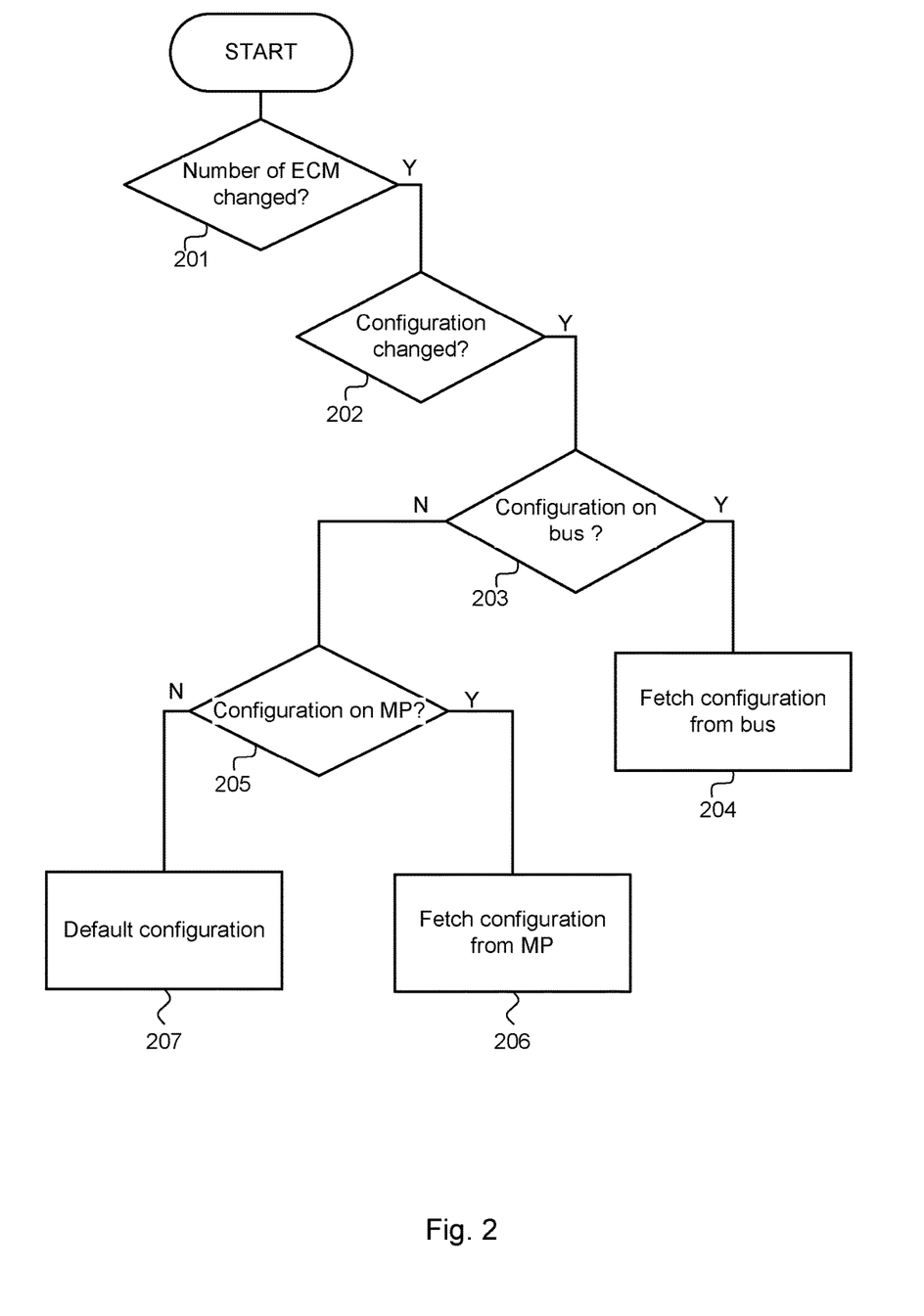
FIG. 2 is a flow diagram illustrating an embodiment of a method for an electronic fuse system.

In FIG. 2 a flow diagram of an embodiment of a method for the electronic fuse system 100 is disclosed. The method comprises the following:

201: Determining if the number of engaged electronic circuit breaker modules 108 has changed compared to the stored configuration;

Upon determining that the number of engaged electronic circuit breaker modules 108 has changed, 202: determining if the configuration of the electronic fuse system has changed by means of comparing a stored configuration in the power distribution controller and a current configuration obtained by polling the bus connection means 104.

Upon determining that the configuration of the electronic fuse system has changed, 203: determining if a stored configuration is available from the bus.

Upon 203: determining that a stored configuration is available from the bus, 204: fetch the stored configuration from the bus and start operation of the electronic fuse system according to the fetched configuration.

Upon 203: determining that a stored configuration is not available from the bus, 205: determining if a stored configuration is available from the connectable external main processor 107.

Upon 205: determining that a stored configuration is available from the connectable external main processor 107, 206: fetch the configuration from the connectable external main processor 107 and start operation of the electronic fuse system 100 according to the fetched configuration.

Upon 205: determining that a stored configuration is not available from the connectable external main processor, start operation of the electronic fuse system 100 according to a default configuration 207.

In one embodiment, the stored configuration of the electronic fuse system 100 may comprise information about which bus connection means 104 that is engaged with which power distribution controller 105 by means of storing the address of the bus connection means 104 and the first identifier of the power distribution controller 105. The stored configuration also comprises information about which electronic circuit breaker module 108 that is engaged with which bus connection means 104 by means of storing the address of the bus connection means 104 and the second identifier of the engaged electronic circuit breaker module 108.

In one embodiment may the second identifier of the electronic circuit breaker module 108 comprise information about the electronic fuse 109 such as for example maximum current, trip value, fuse characteristics etc. as well as a type identifier and a serial number. By including such information in the second identifier it is possible for the electronic fuse system to verify its own configuration against a stored configuration. If a replaced electronic circuit breaker module 105 is of the wrong type the electronic fuse system can alert an operator that an error is present, and also which bus connection means that is connected to the wrong type of electronic circuit breaker module 108.

By storing the configuration of the electronic fuse system 100 in both the power distribution controller 105 as well as in the electronic circuit breaker module 108 it is possible for a replaced power distribution controller 105 to fetch the configuration from the electronic circuit breaker module 108. This means that if at least one from the group of electronic circuit breaker modules and the power distribution controller is engaging one of the bus connection means 106 the electronic fuse system can configure itself by means of retrieving a stored configuration through the bus 101.

Figure 3:
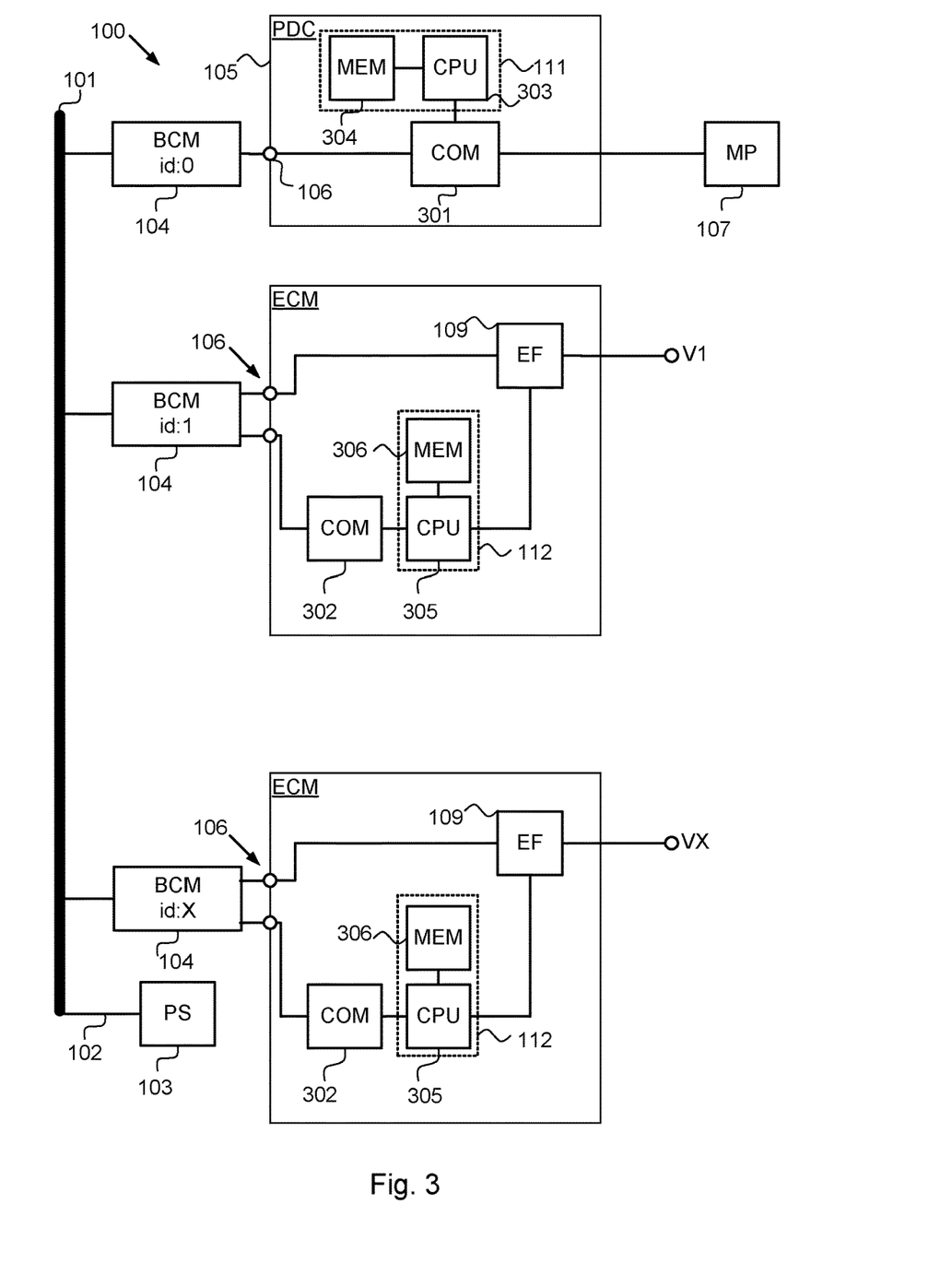
FIG. 3 is a schematic block diagram illustrating an alternative embodiment of an electronic fuse system.

FIG. 3 discloses a schematic block diagram illustrating an embodiment of the electronic fuse system 100. In this embodiment, the first processing means 111 comprises a processor 303 that is connected to a memory 304. The memory comprises instructions for executing the method disclosed hereinabove when executed by the processor 303. The processor 303 is further connected to a communication circuit 301, which is connected to the bus connector 106 for communication via the bus 101. The communication circuit 301 is further configured to be connected to the external main processor 107. This connection may be a serial communication, such as RS-485 or an Ethernet connection. In one embodiment, the communication via the bus 101 is a serial communication, such as the dedicated power management bus (PM-bus). But in alternative embodiments I$^2$C may for example be used.

The second processing means 112 of the electronic circuit breaker module 105 comprises a processor 305 connected to a memory 306, the memory 306 comprises instructions to be executed by the processor 305.

The second processing means 112 may in one embodiment be configured to control the electronic fuse 109. Additionally, the second processing means 112 may also be configured to monitor and log the amount of power that is delivered to the voltage terminal 110 from the bus 101. This logging data may be retrieved by the first processing means 111 by means of the bus 101. In one embodiment, the logging data is uploaded from the first processing means 111 to the connectable external main processor 107. Hence, this logged data can later be used for charging a consumer as well as studying patterns in energy consumption.

A further advantage of controlling the electronic fuse 109 with the second processing means 112 is that the fuse characteristics can be tailored to the application, i.e., the electronic fuse 109 can be configured to allow for large inrush currents during system startup.

The memory of the second processing means 112 comprises a default configuration, that may comprise a default trip current. Hence, if a new circuit breaker module 108 is engaging an unused bus connection mean 104 the new circuit breaker module may operate according to its default configuration. This gives a flexible system that easily is expandable.

Figure 4:
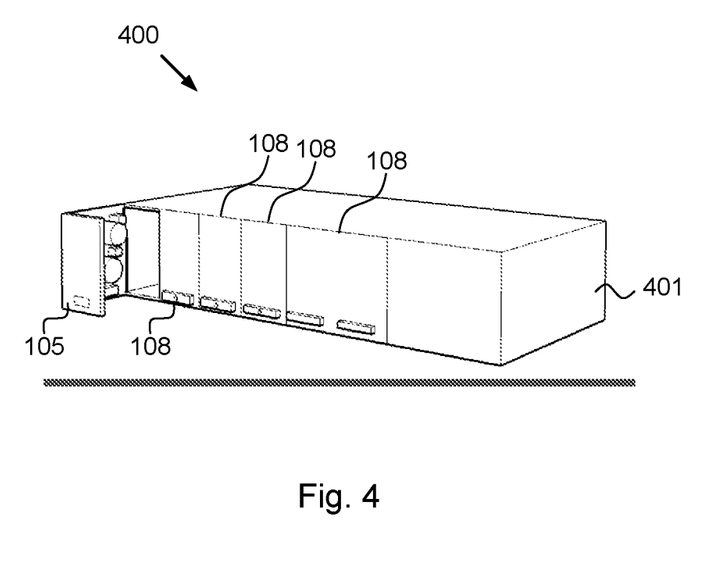
FIG. 4 is a perspective view of an embodiment of an electronic fuse system.

FIG. 4 discloses a schematic perspective view of an embodiment 400 of the electronic fuse system 100. In this embodiment, the bus 101 is arranged in the back of a housing in form of a backplane. The power distribution controller 105 is provided as a circuit board that is inserted into the open front of the housing by means of guides provided in the interior of the housing. The bus connection means 104 is provided in the backplane and comprises a unique address on the bus 101. The power distribution controller slides in the guides until the bus connector 106 engages the bus connection means 104. This embodiment also comprises four electronic circuit breaker modules 108 with the voltage terminal acceptable from the front. By using a housing such as the disclosed one several advantages are achieved. The electronic fuse system according to this embodiment provides a very flexible and expandable solution. Maintenance becomes much simpler.

The above mentioned and described embodiments are only given as examples and should not be limiting. Other solutions, uses, objectives, and functions within the scope of the accompanying patent claims may be possible.

The invention claimed is:

1. Method for an electronic fuse system, the electronic fuse system comprising:
   a bus connectable to an external power supply and a communication line, the bus having at least two bus connection means each having a unique address on the bus;
   a power distribution controller, comprising:
       a first bus connector configured to engage one of the at least two bus connection means;
       a first processing means configured to store a configuration of the electronic fuse system and a first identifier of the power distribution controller; and a communication circuit connected to the first processing means and configured for communication with a connectable external main processor, the communication circuit being further configured to communicate via the first bus connector;
an electronic circuit breaker module, comprising:
a second bus connector configured to engage one of the at least two bus connection means;
an electronic fuse configured to supply a voltage terminal with a voltage from the bus via the second bus connector; and
a second processing means configured to control the electronic fuse and to store the configuration of the electronic fuse system and a second identifier of the electronic circuit breaker module;
the method performed via the first processing means of the power distribution controller and comprising steps of:
determining if a number of engaged electronic circuit breaker modules has changed compared to a stored number;
upon determining that the number of engaged electronic circuit breaker modules has changed, determining if the configuration of the electronic fuse system has changed by comparing the configuration of the electronic fuse system stored in the first processing means of the power distribution controller and a current configuration obtained by polling one of the at least two bus connection means;
upon determining that the configuration of the electronic fuse system has changed, determining if a stored configuration is available from the bus;
upon determining that a stored configuration is available from the bus, fetching the stored configuration from the bus as a first fetched configuration and starting operation of the electronic fuse system according to the first fetched configuration;
upon determining that a stored configuration is not available from the bus, determining if a stored configuration is available from the connectable external main processor;
upon determining that a stored configuration is available from the connectable external main processor, fetching the configuration from the connectable external main processor as a second fetched configuration and starting operation of the electronic fuse system according to the second fetched configuration; and
upon determining that a stored configuration is not available from the connectable external main processor, starting operation of the electronic fuse system according to a default configuration.

2. Method according to claim 1, wherein the step of determining if the configuration of the electronic fuse system has changed further comprises determining a corresponding first or second identifier for each address of the at least two bus connection means, and determining if the configuration of the electronic fuse system has changed based on the determination.

3. Method according to claim 2, wherein the step of determining if the configuration of the electronic fuse system has changed further comprises determining if an electronic circuit breaker module of a correct type is engaging one of the at least two bus connection means with a given address, and upon determining that the electronic circuit breaker module is of a wrong type, generating an error signal.

4. Method according to claim 1, further comprising:
determining an amount of energy delivered to each voltage terminal of the electronic circuit breaker module.

5. Electronic fuse system, comprising:
a bus connectable to a connectable external power supply and a communication line, the bus including at least two bus connection means each having a unique address on the bus;
a power distribution controller, comprising:
a first bus connector configured to engage one of the at least two bus connection means of the bus;
a first processing means configured to store a configuration of the electronic fuse system and an identifier of the power distribution controller; and
a communication circuit connected to the first processing means for communication with a connectable external main processor;
an electronic circuit breaker module, comprising:
a second bus connector configured to engage one of the at least two bus connection means of the bus;
an electronic fuse configured to supply a voltage terminal with a voltage from the bus via the second bus connector; and
a second processing means configured to control the electronic fuse and to store the configuration of the electronic fuse system and an identifier of the electronic circuit breaker module;
wherein the first processing means of the power distribution controller is further adapted to:
determine if a number of engaged electronic circuit breaker modules has changed compared to a stored number;
upon determining that the number of engaged electronic circuit breaker modules has changed, determine if the configuration of the electronic fuse system has changed by comparing the configuration of the electronic fuse system stored in the first processing means of the power distribution controller and a current configuration obtained by polling one of the at least two bus connection means;
upon determining that the configuration of the electronic fuse system has changed, determine if a stored configuration is available from the bus;
upon determining that a stored configuration is available from the bus, fetch the stored configuration from the bus as a first fetched configuration and start operation of the electronic fuse system according to the first fetched configuration;
upon determining that a stored configuration is not available from the bus, determine if a stored configuration is available from the connectable external main processor;
upon determining that a stored configuration is available from the connectable external main processor, fetch the configuration from the connectable external main processor as a second fetched configuration and start operation of the electronic fuse system according to the second fetched configuration; and
upon determining that a stored configuration is not available from the connectable external main processor, start operation of the electronic fuse system according to a default configuration.

6. Electronic fuse system according to claim 5, wherein the first processing means is further adapted to determine a corresponding identifier for each address of the at least two bus connection means, compare this information with stored information, and determine that the configuration of the electronic fuse system has changed if a mismatch between the corresponding identifier and the address is found.

7. Electronic fuse system according to claim 6, wherein the first processing means to further adapted to determine if an electronic circuit breaker module of a correct type is engaging the at least two bus connection means with a given address, and generate an error signal in response to determining that the electronic circuit breaker module is of a wrong type.

8. Electronic fuse system according to claim 5, wherein the second processing means is further adapted to:
   determine an amount of energy delivered to each voltage terminal of the electronic circuit breaker module.

9. Electronic fuse system according to claim 5, wherein the first processing means and the second processing means each comprises a processor and a memory and wherein each of the memories contains instructions executable by a corresponding one of the processors.

10. Electronic fuse system, comprising:
   a bus connectable to an external power supply and a communication line, the bus having at least two bus connections each having a unique address on the bus with at least one of the bus connections connectable to an electronic circuit breaker module of the electronic fuse system; and
   a power distribution controller coupled to the bus and having a processor and a memory, the power distribution controller being configured to store a configuration of the electronic fuse system and to:
   determine if a number of engaged electronic circuit breaker modules has changed;
   upon determining that the number of engaged electronic circuit breaker modules has changed, determine if the configuration of the electronic fuse system has changed;
   upon determining that the configuration of the electronic fuse system has changed, determine if a stored configuration is available from the bus;
   upon determining that a stored configuration is available from the bus, fetch the stored configuration from the bus as a first fetched configuration and start operation of the electronic fuse system according to the first fetched configuration;
   upon determining that a stored configuration is not available from the bus, determine if a stored configuration is available from a connectable external processor;
   upon determining that a stored configuration is available from the connectable external processor, fetch the configuration from the connectable external processor as a second fetched configuration and start operation of the electronic fuse system according to the second fetched configuration; and
   upon determining that a stored configuration is not available from the connectable external processor, start operation of the electronic fuse system according to a default configuration.

* * * * *